(12) United States Patent
Hernacki et al.

(10) Patent No.: US 8,214,878 B1
(45) Date of Patent: Jul. 3, 2012

(54) POLICY CONTROL OF VIRTUAL ENVIRONMENTS

(75) Inventors: Brian Hernacki, Mountain View, CA (US); Sourabh Satish, Fremont, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 895 days.

(21) Appl. No.: 12/238,356

(22) Filed: Sep. 25, 2008

(51) Int. Cl.
*H04L 29/00* (2006.01)
(52) U.S. Cl. ............. 726/1; 726/2; 726/3; 726/4; 726/5; 726/6; 726/7; 726/8; 726/9; 726/10; 726/11; 726/12; 726/13; 726/14; 726/15
(58) Field of Classification Search .................. 726/1–15
See application file for complete search history.

(56) References Cited

U.S. PATENT DOCUMENTS

| 7,577,722 | B1 * | 8/2009 | Khandekar et al. ........... 709/220 |
| 2008/0059556 | A1 * | 3/2008 | Greenspan et al. ........... 709/201 |
| 2008/0134175 | A1 * | 6/2008 | Fitzgerald et al. ................ 718/1 |

* cited by examiner

*Primary Examiner* — Philip Chea
*Assistant Examiner* — Ghazal Shehni
(74) *Attorney, Agent, or Firm* — Brill Law Office; Jeffrey Brill

(57) ABSTRACT

When copying a guest from a source virtual environment to a target virtual environment, policy control of the target environment is provided. A configuration specification is created based on the source virtual environment and the guest to be copied. The configuration specification contains specific policies and/or requirements of the guest. The guest and the configuration specification are copied to the target virtual environment. The target virtual environment is examined to determine whether it is compliant with the copied configuration specification. If so, the copied guest runs in the target virtual environment. If not, the target virtual environment can be modified to be in compliance with the configuration specification.

20 Claims, 2 Drawing Sheets

POLICY CONTROL OF VIRTUAL ENVIRONMENTS

TECHNICAL FIELD

This invention pertains generally to computer virtualization, and more specifically to providing policy control of a target virtual environment when porting a guest.

BACKGROUND

In the world of virtual computing, a guest can be migrated to a different, compatible virtual environment (e.g., an environment comprising one or more guests, a physical or virtual host, and a virtualization component such as a hypervisor). However, when a guest is copied from one virtual environment to another, the target virtual environment might not be compliant with the policies/requirements of the guest. For example, the guest might require a specific amount of memory or disk space that the target virtual environment does not have available, or the guest might have specific network communication requirements that are not met by the target virtual environment. While the guest can verify its own configuration, it lacks the ability to ensure that a virtual environment in which it runs is complaint with its own policy requirements. It would be desirable to address this shortcoming.

SUMMARY

When copying a guest from a source virtual environment to a target virtual environment, policy control of the target virtual environment is provided. A configuration specification is created based on the source virtual environment and the guest to be copied. The configuration specification contains specific policies and/or requirements of the guest. The guest and the configuration specification are copied to the target virtual environment. The target virtual environment is examined to determine whether it is compliant with the copied configuration specification. If so, the copied guest runs in the target virtual environment. If not, the target virtual environment can be modified to be in compliance with the configuration specification.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
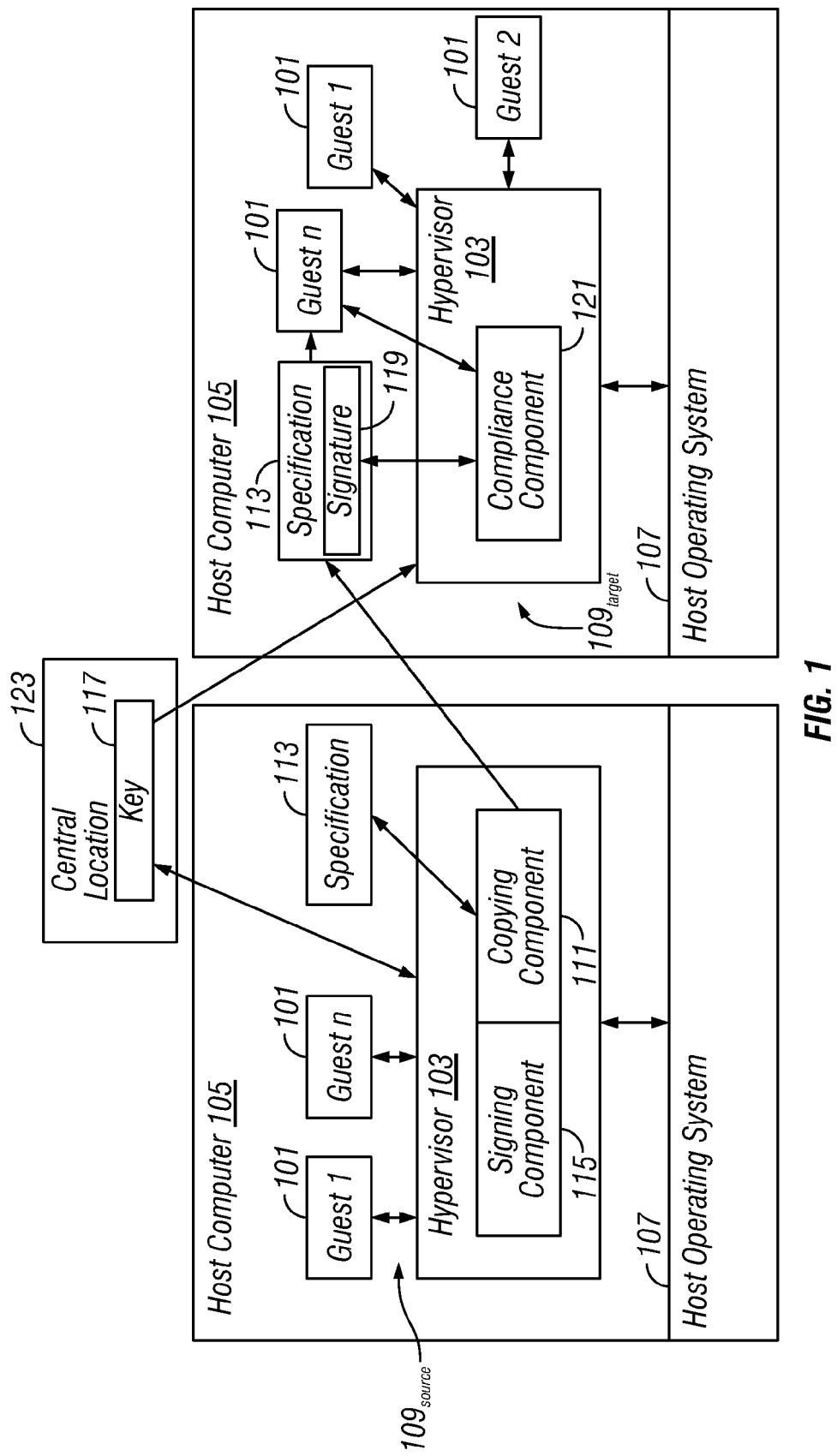
FIG. 1 is a block diagram illustrating a system for providing policy control of a target virtual environment when porting a guest, according to some embodiments of the present invention.

FIG. 1 illustrates a system for providing policy control of a target virtual environment $109_{target}$ when porting a guest 101, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

In the embodiment illustrated in FIG. 1, a first (source) virtual environment $109_{source}$ is shown which comprises a hypervisor 103 and two guests 101 running on a single (host) physical computer 105 and a (host) operating system 107 running on that physical computer 105. FIG. 1 also illustrates a second (target) virtual environment $109_{target}$ in which three guests 101 and a hypervisor 103 run on a host 105. As illustrated in FIG. 1 and described in detail below, one of the guests 101 of the source virtual environment $109_{source}$ is copied to the target virtual environment $109_{target}$. It is to be understood that a virtual environment 109 can include a single guest 101, or a much larger number of guests 101 than illustrated in the examples in FIG. 1.

In various virtualization scenarios, the hypervisor 103 can act as an interface between the guests 101 and the host operating system 107 for some or all of the functions of the guests 101. In other virtualization implementations, there is no underlying host operating system 107 running on the physical computer 105. In those situations, the hypervisor 103 acts as an interface between the guests 101 and the hardware of the physical computer 105. Even where a host operating system 107 is present, the hypervisor 103 sometimes interfaces directly with the hardware for certain services. In some virtualization scenarios, the host 105 itself is in the form of a guest 101 (i.e., a virtual host) running on another host 105.

In various embodiments of the present invention, the hypervisor 103 can interact with a host operating system 107 and/or directly with the (physical or virtual) hardware of the host computer 105 as desired. It is to be further understood that the services described herein as being performed by a hypervisor 103 are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

As illustrated in FIG. 1, a copying component 111 running at the hypervisor 103 level in the source virtual environment $109_{source}$ creates a configuration specification 113 as part of the process of creating a guest 101 to export. This configuration specification 113 is based on the configuration of the source virtual environment $109_{source}$ and the guest 101 to be copied, and optionally also on any additional local policy directives (not illustrated) indicating specific factors to include. In other words, the copying component 111 analyzes the current configuration of the guest 101 being copied and the source virtual environment $109_{source}$, and creates a corresponding configuration specification 113. The configuration specification 113 includes specific policies and/or requirements of the guest 101 (e.g., memory or disk requirements, network requirements, file system configuration, hardware configuration, etc.). Where desired, policy directives local to the source virtual environment $109_{source}$ can provide specific instructions to the copying component 111, indicating configuration specific information to include in the configuration specification 113.

In some embodiments, a signing component 115 signs the configuration specification 113 with a key 117. This key 117 can be part of a Public Key Infrastructure (PKI) signing chain in more complex configurations. (A PKI is an arrangement that binds public keys with respective user identities by means of a certificate authority.) The signature 119 on the configuration specification 113 can be used to prevent malicious use thereof as described below.

When a guest 101 is copied to the target virtual environment $109_{target}$, the corresponding configuration specification 113 is transported therewith. When a guest 101 is imported, a compliance component 121 running at the hypervisor 103 level in the target virtual environment $109_{target}$ processes the configuration specification 113. If the target virtual environment $109_{target}$ is not compliant with the configuration specification 113, the compliance component 121 configures the target virtual environment $109_{target}$ accordingly (or blocks the import of the guest 101 if it is not practicable or desirable to make such modifications to the target virtual environment $109_{target}$).

Where desired for security purposes, the hypervisor 103 also checks the signature 119, and only respects the configuration specification 113 if it is signed by a trusted virtual environment 109. This level of security check can prevent breaches such as, e.g., a party exporting a guest 101 and subsequently tampering with the configuration specification 113 to change the target virtual environment $109_{target}$. This type of malicious behavior could be used to take control of priority, privilege, network access, etc.

To provide an additional level of security, the use of signed configuration specifications 113 can be combined with encryption of the guest 101. At export time, the copying component 111 can encrypt the guest 101, e.g., by using a key 117 stored at a centrally managed location 123 which is accessible only to trusted virtual environments 109. The compliance component 121 can access the key 117 and decrypt the guest 101 upon receipt. This additional step further prevents someone from exporting the guest 101 and loading it on an unauthorized virtual environment 109.

Figure 2:
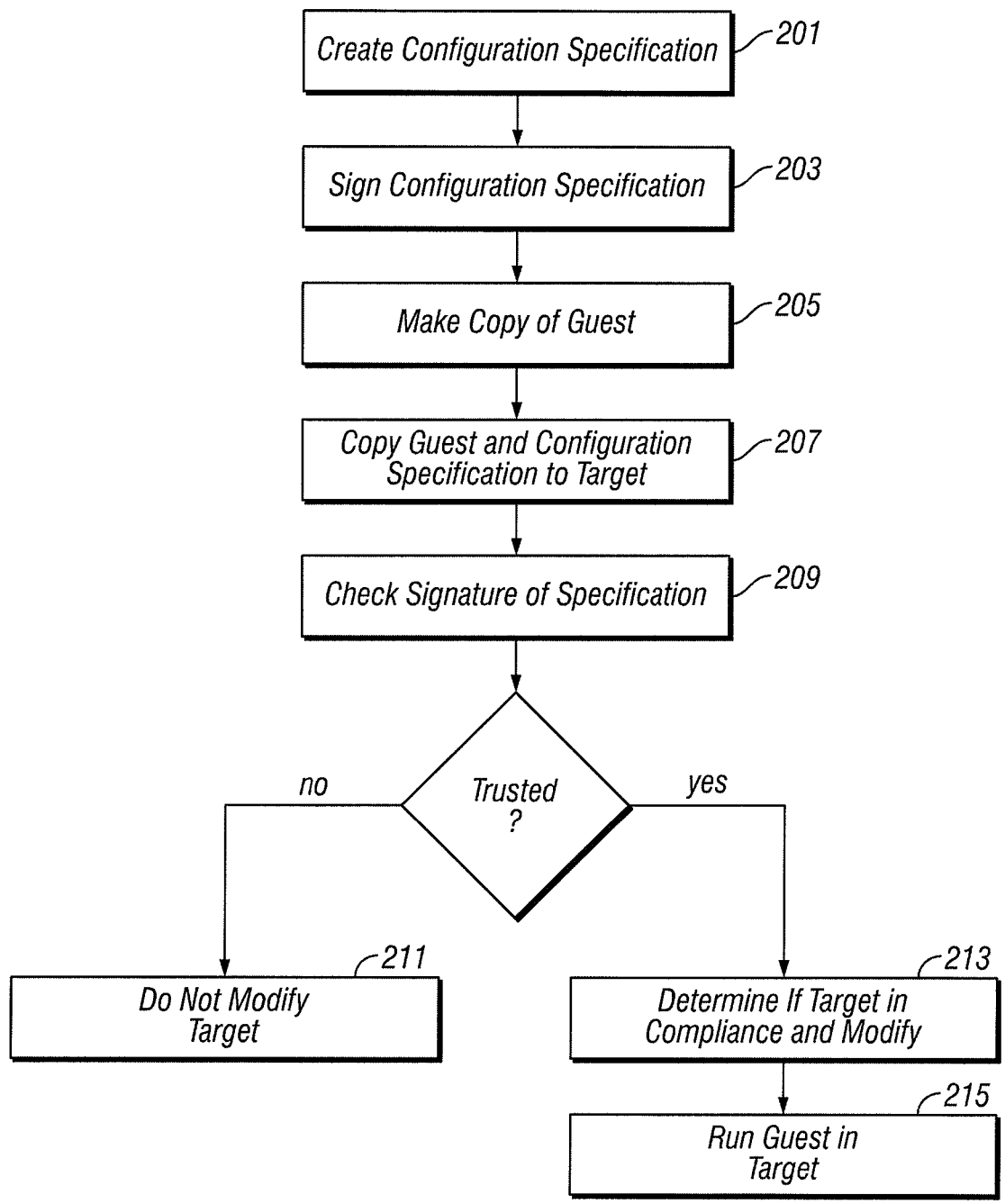
FIG. 2 is a flowchart illustrating steps for providing policy control of a target virtual environment when porting a guest, according to some embodiments of the present invention.

FIG. 2 illustrates steps for providing policy control of a target virtual environment $109_{target}$ (FIG. 1) when copying a guest 101 (FIG. 1), according to some embodiments of the present invention. The copying component 111 (FIG. 1) creates 201 a configuration specification 113 (FIG. 1) based on the source virtual environment $109_{source}$ (FIG. 1) and the guest 101 (FIG. 1) to be copied. The signing component 115 (FIG. 1) signs 203 the configuration specification 113 (FIG. 1). The copying component 111 (FIG. 1) makes 205 a copy of the guest 101 (FIG. 1) to be ported, and copies 207 the guest 101 (FIG. 1) and the signed configuration specification 113 (FIG. 1) to the target virtual environment $109_{target}$ (FIG. 1).

The compliance component 121 (FIG. 1) of the target virtual environment $109_{target}$ (FIG. 1) checks 209 the signature 119 (FIG. 1) of the imported configuration specification 113 (FIG. 1). If the compliance component 121 (FIG. 1) cannot authenticate the configuration specification 113 (FIG. 1), it does not modify 211 the target virtual environment $109_{target}$ (FIG. 1). On the other hand, if the configuration specification 113 (FIG. 1) has a valid signature 119 (FIG. 1), the compliance component 121 (FIG. 1) determines whether the target virtual environment $109_{target}$ (FIG. 1) is in compliance, and makes 213 any specified modifications. The copied guest 101 (FIG. 1) can now run 215 in the target virtual environment $109_{target}$ (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A machine implemented method for providing policy control of a target virtual environment when porting at least one guest from a source virtual environment, the method comprising the steps of:
　　analyzing, by a computer, configuration information concerning the at least one guest;
　　analyzing, by the computer, configuration information concerning the source virtual environment;
　　automatically creating, by the computer, at least one configuration specification based on at least the analysis of both the at least one guest and the source virtual environment, at a source virtual environment; further basing, by the computer, the at least one configuration specification on at least one additional local directive of the at least one guest; determining, by the computer, that the target virtual environment is not compliant with the at least one configuration specification;
　　modifying, by the computer, the target virtual environment so as to be compliant with the at least one configuration specification;
　　copying, by the computer, the guest to the target virtual environment; and
　　running, by the computer, the copied guest in the target virtual environment.

2. The method of claim 1 further comprising:
　　determining, by the computer, that the target virtual environment is compliant with a second configuration specification of a second guest;
　　copying, by the computer, the second guest to the target virtual environment; and
　　running, by the computer, the second copied guest in the target virtual environment.

3. The method of claim 1 further comprising:
　　determining, by the computer, that the target virtual environment is not compliant with a second configuration specification of a second guest; and not running the second guest in the target virtual environment.

4. The method of claim 1 further comprising:
copying, by the computer, at least a second the configuration specification to the target virtual environment.

5. The method of claim 4 wherein copying at least the second configuration specification to the target virtual environment further comprises:
copying, by the computer, a second guest to the target virtual environment.

6. The method of claim 1 further comprising:
signing, by the computer, the at least one configuration specification at a source virtual environment level;
checking, by the computer, the signature of the at least one configuration specification at a target virtual environment level; and
only proceeding with processing of the at least one configuration specification responsive to determining that the at least one configuration specification is signed by a trusted virtual environment.

7. The method of claim 1 further comprising:
encrypting, by the computer, the at least one guest at a source virtual environment level with a key available only to trusted virtual environments;
copying, by the computer, the at least one guest to the target virtual environment;
and decrypting the at least one guest at a target virtual environment level.

8. At least one nontransitory processor readable medium containing a computer program product for providing policy control of a target virtual environment when porting at least one guest from a source virtual environment, the computer program product comprising:
program code for analyzing configuration information concerning the at least one guest;
program code for analyzing configuration information concerning the source virtual environment;
program code for creating at least one configuration specification based on at least the analysis of both the at least one guest and the source virtual environment, at a source virtual environment level;
program code for further basing the at least one configuration specification on at least one additional local directive of the at least one guest;
program code for determining that the target virtual environment is not compliant with the at least one configuration specification;
program code for modifying the target virtual environment so as to be compliant with the at least one configuration specification;
program code for copying the at least one guest to the target virtual environment; and
program code for running the copied guest in the target virtual environment.

9. The computer program product of claim 8 further comprising:
program code for determining that the target virtual environment is compliant with a second configuration specification of a second guest;
program code for copying the second guest to the target virtual environment; and
program code for running the second copied guest in the target virtual environment.

10. The computer program product of claim 8 further comprising:
program code for determining that the target virtual environment is not compliant with a second configuration specification of a second guest; and
program code for not running the second guest in the target virtual environment.

11. The computer program product of claim 8 further comprising:
program code for copying at least a second configuration specification to the target virtual environment.

12. The computer program product of claim 11 wherein the program code for copying at least the second configuration specification to the target virtual environment further comprises program code for:
copying a second guest to the target virtual environment.

13. The computer program product of claim 8 further comprising:
program code for signing the at least one configuration specification at a source virtual environment level;
program code for checking the signature of the at least one configuration specification at a target virtual environment level; and
program code for only proceeding with processing of the at least one configuration specification responsive to determining that the at least one configuration specification is signed by a trusted virtual environment.

14. The computer program product of claim 8 further comprising:
program code for encrypting the at least one guest at a source virtual environment level with a key available only to trusted virtual environments;
program code for copying the at least one guest to the target virtual environment; and
program code for decrypting the at least one guest at a target virtual environment level.

15. A computer system for providing policy control of a target virtual environment when porting at least one guest from a source virtual environment, the computer system comprising:
a processor;
system memory;
at least one hypervisor in the system memory, wherein said at least one hypervisor is configured for analyzing configuration information concerning the at least one guest, analyzing configuration information concerning the source virtual environment, creating at least one configuration specification based on at least the analysis of both the at least one guest and the source virtual environment, at a source virtual environment level, and,
wherein said at least one hypervisor is further configured for determining that the target virtual environment is not compliant with the at least one configuration specification, modifying the target virtual environment so as to be compliant with the at least one configuration specification, copying the at least one guest to the target virtual environment, and running the at least one copied guest in the target virtual environment.

16. The computer system of claim 15, wherein said at least one hypervisor is further configured for determining that the target virtual environment is compliant with a second configuration specification of a second guest, copying the second guest to the target virtual environment, and running the second copied guest in the target virtual environment.

17. The computer system of claim 15, wherein said at least one hypervisor is further configured for copying at least the a second configuration specification to the target virtual environment.

18. The computer system of claim 17 wherein said at least one hypervisor is further configured for copying at least the second configuration specification to the target virtual environment and for copying a second guest to the target virtual environment.

19. A machine implemented method for providing virtual environment policy control, the method comprising the steps of:
   a virtual environment in a computer receiving at least one guest and at least one configuration specification, wherein said at least one configuration specification is based on the analysis of each of the at least one guest, the source virtual environment, and at least one additional local directive of the at least one guest, and wherein said at least one configuration specification indicating operating conditions for the at least one guest;
   modifying, by the computer, the virtual environment so as to provide operating conditions for the at least one guest as indicated by the at least one configuration specification; and
   running, by the computer, the at least one received guest as part of the virtual environment.

20. The method of claim 19 wherein modifying the virtual environment further comprises performing a step from a group of steps consisting of:
   modifying, by the computer, a network configuration of the virtual environment;
   modifying, by the computer, a memory management configuration of the virtual environment;
   modifying, by the computer, a disk management configuration of the virtual environment;
   modifying, by the computer, a file system configuration of the virtual environment;
   modifying, by the computer, a virtual hardware resource configuration of the virtual environment; and
   modifying, by the computer, a physical hardware resource configuration of the virtual environment.

* * * * *